United States Patent Office 3,307,142
Patented Feb. 28, 1967

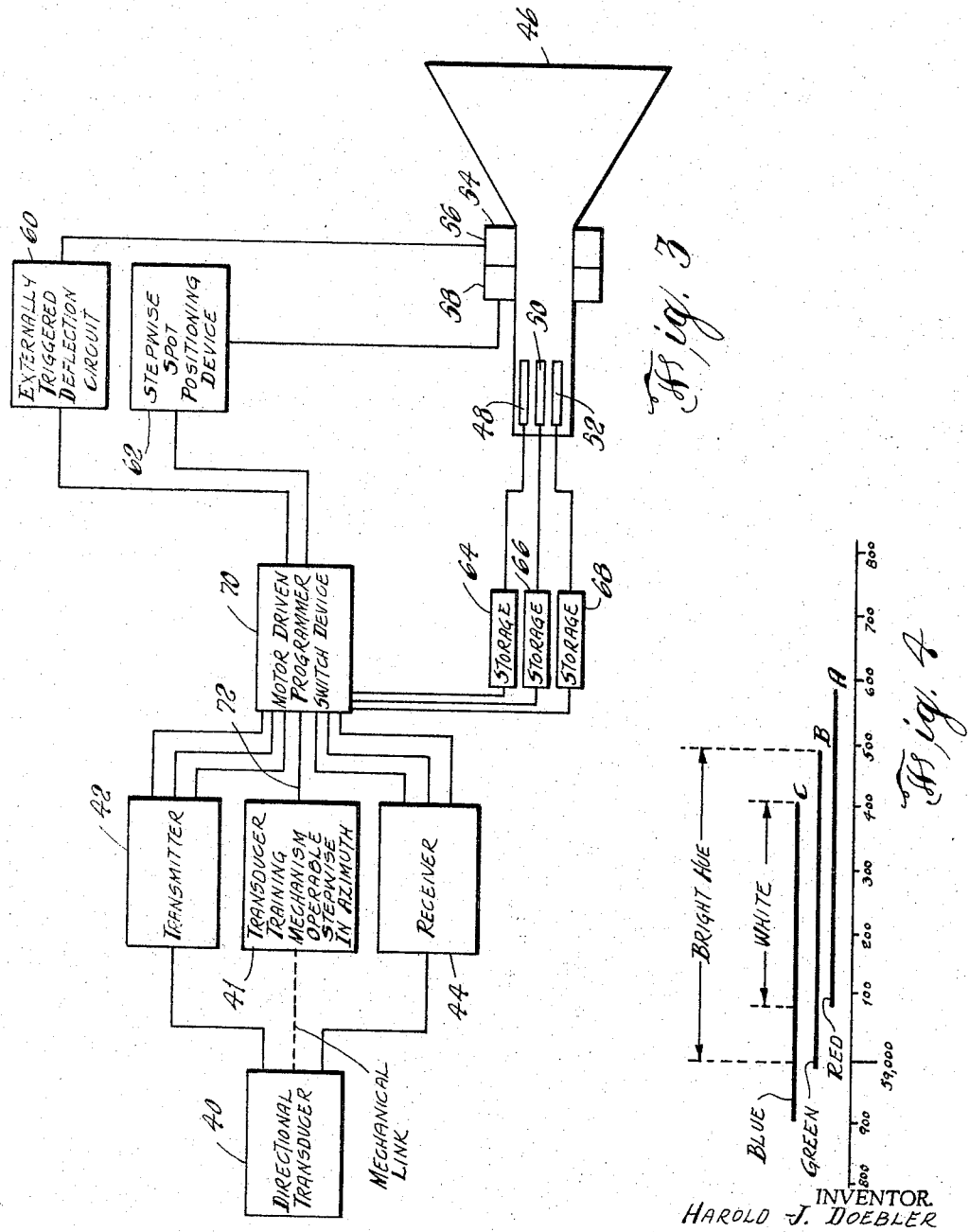

3,307,142
THREE-COLOR ECHO RANGING DISPLAY
Harold J. Doebler, New London, Conn., assignor to the United States of America as represented by the Secretary of the Navy
Filed June 10, 1964, Ser. No. 374,212
5 Claims. (Cl. 340—3)

The invention described herein may be manufactured and used by or for the Government of the United States of America for governmental purposes without the payment of any royalties thereon or therefor.

This invention relates to displaying echo ranging signals in color for target echo vis-a-vis random noise discrimination. Additionally, this invention relates to ascertaining the range rate of a moving target.

Chapter 8 of Fundamentals of Sonar by J. W. Horton, published by the United States Naval Institute at Annapolis, Maryland includes a discussion of echo ranging and problems in echo ranging. The following abstracted from Fundamentals of Sonar, is included as background to this invention.

Echo-ranging systems function by virtue of the reflection of acoustic energy from some object fully or partially submerged in water. In echo ranging the target observed is caused to act as a secondary sources of acoustic energy. It is thus possible by means of echo signal transmission to detect the approach or the presence of an otherwise silent target. By measuring the duration of the signal travel time and determining the target bearing it is also possible, from a single observation point, fully to establish the position of a reflecting target, which may or may not be silent. The basic operations involved in echo ranging are the transmission of waves of acoustic energy and the subsequent reception of such portions of this energy as may be directed to an observation point by reflection. The outgoing signal is generally known as the pulse and the returned signal, after reflection by some given target, is the echo. Energy returned by reflectors other than that which it is desired to observe is known as reverberation. The relation between echo and reverbration is, in some respects, similar to the signal-to-noise ratio and is often the factor which limits the performance of an echo-ranging system.

In echo ranging it is often difficult to find any significant difference between the echo and the reverberation. The echo signal is in fact, merely a component of general reverberation to which special interest is attached.

The surface and the bottom of the ocean reflect acoustic energy. Since these show the same characteristic behavior it is convenient to refer to these reflections as boundary reverbration. Impendance discontinuities in the volume of the ocean itself due to cause such as air bubbles occulded by wave action, gas bubbles from decaying vegetation, and living organisims reflect acoustic energy and this action is referred to as volume reverberation.

On a scope display reverberation can mask target echoes. This is particularly true in utilizing the bottom bounce and convergence zone path technique wherein the operator is presented with the problem of seeing a target in an insoified ocean area as large as 1000 square miles. Sufficient reverberation may be returned from an ocean area so large as to mask target echoes.

The term random noise used hereinafter includes reverberation from a series of pulses that does not correlate.

An object of this invention is to increase target echo to random noise discrimination of an echo ranging system.

A further object is to improve sonar search capability over large ocean areas, as in long range searching wherein there is considerable random noise return for each emitted pulse.

A further object is to provide, in active search sonar systems for large ocean areas, a superior target detection apparatus than has been available heretofore.

A further object is to improve target echo discrimination in a sonar system employing the bottom bounce and convergence zone path technique.

Other objects and advantages will appear from the following description of an example of the invention, and the novel features will be particularly pointed out in the appended claims.

FIG. 3 illustrates a B-scope display system embodying the principles of this invention, and FIG. 4 illustrates an assumed set of operating conditions of the system in FIG. 3.

This invention employs color to increase target echo to random noise discrimination on scope displays. In a color television tube, a white spot is produced by color addition of the three primary colors. In this invention, three distinct sonar pulses are transmitted, each assigned a primary color. Energy returned by the respective pulses are coupled after processing, to the corresponding electron gun of a color cathode ray tube for intensity modulating the respective electron beams. Random uncorrelated noise registers on the tube screen as scattered colors. Target echoes are correlated by color addition and register approximately white. Relative target motion is indicated by bright color hues obtained by the addition of two of the three primary colors at the head end and two of the three primary colors at the tail end of a target registration in white.

Figure 1:
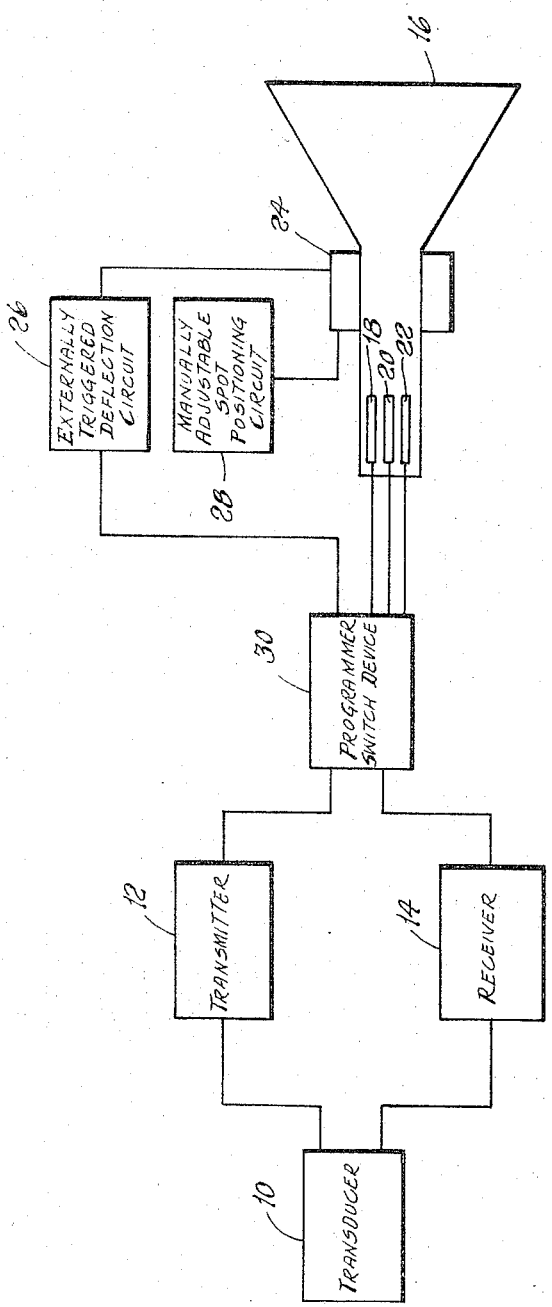
FIG. 1 illustrates a simplified embodiment of the invention.

An embodiment of the basic principles of the invention is shown in FIG. 1 and includes a transducer 10, a transmitter 12 and a receiver 14 coupled to the transducer 10, and cathode ray color tube 16 that is either electromagnetic or electrostatic for displaying signal energy from the receiver. The color tube 16 has three electron guns 18, 20, 22, a long persistance phosphor with a decay time of at least several minutes and a deflection yoke 24 including horizontal deflection and vertical deflection coils. A deflection circuit 26 of the type that requires an external trigger pulse for each deflection cycle is coupled either to the horizontal or vertical deflection coils. A manually adjustable spot positioning circuit 28 is coupled to the other deflection coils.

A programmer switch device 30 is coupled to the transmitter for initiating each pulse output of the transmitter, is coupled to the deflection circuit 26 for triggering the deflection either in coincidence with or a predetermined time following the initiation of each pulse output of the transmitter, and is coupled to the receiver output and the electron guns of the color tube for delivering the receiver output selectively to one of the electron guns. The programmer switch device need not deliver any trigger pulses; it may trigger the transmitter and deflection circuit by momentarily grounding or shunting a portion of the respective circuits. Each time the transmitter is triggered, the programmer switch decouples the receiver from the electron gun it was last coupled to and coincidentally with triggering of the deflection circuit, the programmer switch device couples the receiver output to another of the electron guns. For any three successive pulse outputs from the transmitter, the receiver output is coupled to the three electron guns in succession. A rotary cam switch, a rotary drum switch, a rotary stacked wafer switch, or other rotary plural switch may be used as the programmer switch device. In the simplest mode of operation, the programmer switch device may be equipped with a handwound spring motor as in a photographic timer, for causing the transducer to deliver three pulses to the water in predetermined spaced relationship and for delivering echoes to the three guns of color tube 16.

The speed of sound in water is approximately one mile per second and if emission and return is considered together the speed of sound is approximately one-half mile per second. In other words, for a maximum range of five miles, the total time between delivering the pulse to the water and for an echo to return from five miles is ten seconds. Assuming for purposes of this description, a maximum range of five miles is desired and the pulse energy delivered to the water is such that no appreciable echo is returned from beyond five miles, the programmer switch device causes the transmitter to deliver three pulses to the water, ten seconds apart, when the programmer is activated.

Signal energy from the receiver corresponding to the three pulses is coupled by the programmer switch device to the three electron guns 18, 20, 22 whereby for any selected setting of the spot positioning circuit 30, the signals corresponding to the three pulses record along one trace path as a function of range.

The electron guns are biased to cutoff and signals from the receiver overcome the cutoff bias. A series of spots are registered along the trace path; a target echo registers as a white spot by addition of the primary colors while random uncorrelated noise registers in one of the primary colors. Relative movement of the target shows up as brighter hued spots at the leading and trailing ends of the white spot for the target and results from the addition of two of the primary colors. If the decay time of the phosphor of the color tube is relatively short, less than one minute, one trace path may be used continuously and a motor driven programmer switch device may be substituted for the manual type. If the decay time of the phosphor is several minutes or longer, the trace path may be shifted by means of the spot positioning circuit prior to resetting the programmer switch device for a succeeding series of three echo-ranging pulses. The spot positioning circuit may be a bistable flip-flop circuit triggered coincidentally with the first pulse of each series of three pulses for shifting between two trace paths with successive three pulse series.

As the maximum range is increased the time increases; e.g. for a range of thirty miles the traversal time is approximately one minute. Therefore an echo-ranging series of three pulses in succession for up to thirty mile range occupies on the order of three minutes. Assuming that the range of interest is twenty to thirty miles it is possible to compress the time for the series by transmitting a succeeding pulse before the echoes of preceding pulses are returned from the maximum range. To preclude confusion between energy returned from twenty to thirty miles from a preceding pulse and energy returned from near-in from the most recent pulse, each of the series of three pulses are transmitted at a different frequency. The lower limit of time interval between successive pulses is limited by the sound travel time over the range of interest. The sweep time on the cathode ray tube is equal to the time interval between successive pulses; without a storage and readout device, the echoes returned by the successive signal pulses are applied to three electron guns 18, 20 and 22 in succession.

Using essentially the same technique described above, the deflection yoke may be energized for a spiral or P.P.I. display.

Figure 2:
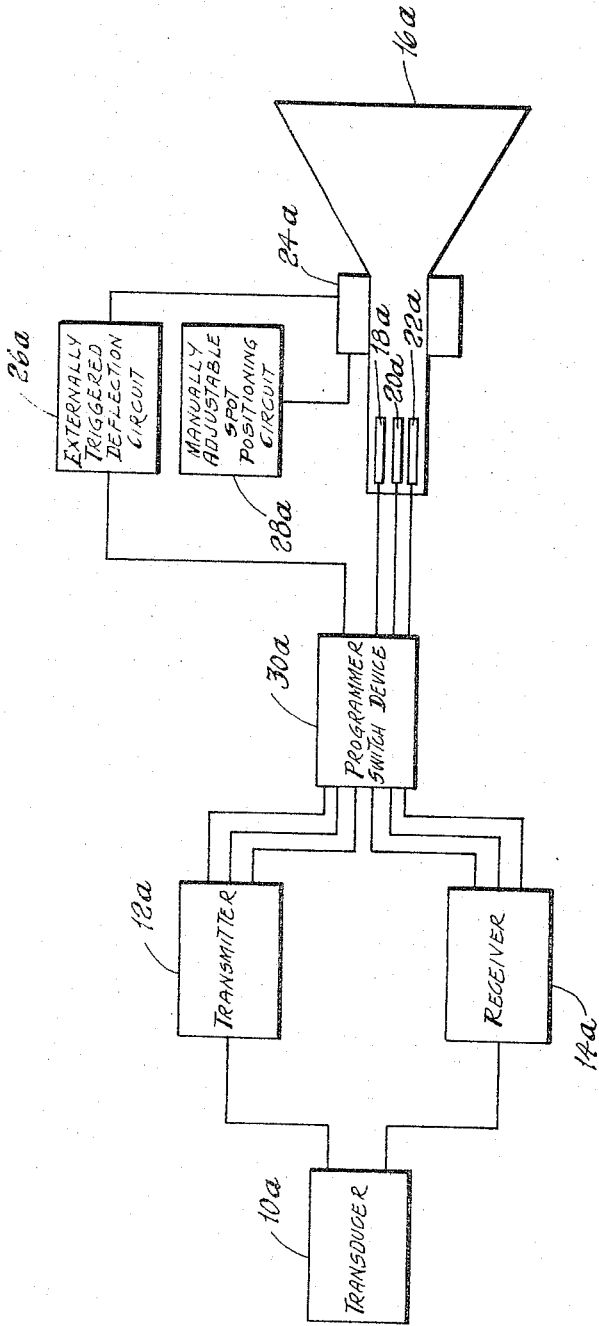
FIG. 2 illustrates modification of the circuit in FIG. 1 employing three different pulse frequencies.

The circuit shown in FIG. 2 differs from that in FIG. 1 in that the transmitter 12a has oscillator circuitry for three different frequencies and the receiver 14a has filter circuitry for selecting energy returned on each of the three frequencies.

The programmer switch device 30a selects the three different transmitter frequencies in rotation and couples together the electron gun and receiver output corresponding to the respective transmitter frequency.

To simplify the display, the receiver 14a may be provided with a threshold means, an amplifier and limiter for amplifying every echo that exceeds the threshold to a predetermined amplitude.

In the embodiment shown in FIG. 3 the invention is employed for a B-scope display. Conventionally, the B-scope pattern is rectangular, with its vertical axis representing range and its horizontal axis representing bearing. The phosphors for B-scope displays have very long persistence. The width of the B-scope corresponds to a selected azimuth angle, and the number and spacing of the vertical lines correspond to the azimuth orientation of the directive axis of the transducer.

The embodiment in FIG. 3 includes a directional transducer 40 trainable stepwise in azimuth by a mechanism 41. A transmitter 42 having oscillator means for pulse outputs at three different frequencies and a receiver 44 having filter means for selecting echoes at one of the three frequencies are coupled to the transducer 40. The display device is a cathode ray color tube 46 having very long persistence phosphor, three electron guns 48, 50 and 52 for the respective primary colors, and a deflection yoke having vertical deflection coils 56 and horizontal deflection coils 58. An externally triggered deflection circuit 60 is coupled to the vertical deflection coils and a stepwise spot positioning device 62 coupled to the horizontal deflection coils 58. Signal storage elements 64, 66 and 68 are provided for the electron guns 48, 50, and 52 respectively. The storage devices may be three magnetic recorder and reproducer devices according to U.S. Patent 3,015,810, a scan converter type storage tube or other that can record at one speed at spaced intervals and playback the recorded information a number of times at a higher speed during the intervals.

A motor driven programmer switch device 70 is coupled by a lead 72 to the transducer training mechanism 41 for causing the latter to step the transducer around approximately equiangularly in azimuth. The transmitter 42 is operated at three different frequencies in rotation. The outputs of the receiver 44 corresponding to the three frequencies are coupled to the storage devices 64, 66 and 68 in rotation, erasure occuring immediately prior to recording. The stored information from all three is read out continuously at a rate many times the recording rate. The deflection circuit is triggered with the start of each readout of the three storage devices which in turn corresponds to the inner limit of the range of interest. The spot positioning device is stepped each time signals are recorded on a selected one of the storage devices.

The operation of the system illustrated in FIG. 3 is more apparent by describing one arbitrarily assumed set of operating conditions.

Let is be assumed the B-scope is programmed to cover the range interval between twenty-five and thirty miles to cover a 275 square mile ring of ocean area at that range at each azimuthal setting of the transducer. Using the bottom bounce sound path, a target should be detected in this ring even if water conditions prevent a contact from being held at a closer range. The time required for a ping to return from thirty miles using the bottom bounce sound path is about seventy-five seconds. Three pulses or pings are put in the water before the first thirty-mile echo returns, in order to increase the information rate. Sonar information from the respective pings is kept separate in two ways namely (a) by using a slightly different transmission frequency for each of the three pings and (b) by timing the three transmissions such that when twenty-five to thirty mile information is returning from the first ping, the five to ten and fifteen to twenty mile information is returning from the two subsequent pings. The operator does not search the convergence zone area during the period of transmission and of loud reverberations present immediately after transmission.

The B-scope is continually illuminated with echo information between pings. The incoming convergence zone sonar information is put in a storage device and displayed on the scope at a rapid rate a considerable number of times. Each electron gun receives continuous information from a storage device associated with one of the three operating frequencies. The resulting picture shows random uncorrelated echoes in color. Concurrent echoes which have appeared in three successive ping returns are integrated by color addition. During each step of the device 62 three-color traces showing the target are superimposed and produce a white spot for correlated echoes. Relative target motion is indicated by color hues on the head and tail ends of a white spot. The operator disregards scattered primary colors and watches for the correlation of echoes by white or bright hued spots.

Sonar transmissions occur every twenty-five seconds. New echo information is received during twelve and one-half seconds of each twenty-five seconds. About twelve seconds remain for processing the display and studying the results. This is sufficient time to display echo information with many different assumed target range rates, thereby insuring integration of three echoes for all targets. To determine the range rate the receiver may be provided with a calibrated variable delay means for echoes returned at two of the three transmission frequencies to superimpose target traces that have head and tail in bright colored hues.

*Action of programmer*

Time
(seconds):  Action order
0_____ First ping on frequency A.
25_____ First ping on frequency B.
50_____ First ping on frequency C.
62½–75_____ Receiver signal information processed with A circuit bandpass, fed to storage A, and placed on scope as red.
75_____ Second ping on frequency A.
75–87½_____ Display processing.
87½–100____ Receiver signal information processed with B circuit bandpass, fed to storage B, and placed on scope as green.
100_____ Second ping on frequency B.
100–112½___ Display processing.
112½–125___ Receiver signal information processed with C circuit bandpass, fed to storage C, and placed on scope as blue.
125_____ Second ping on frequency C.
125–137½___ Display processing.
137½–150___ Etc.

Let it be assumed that the initial target range is 60,000 yards, that the target range-rate component closing is ten knots, that own-ship range rate component closing is fifteen knots, that the effective target length including wake is ninety-three yards, that each ping is five hundred milliseconds for which the pulse length is 410 yards less three yards that own-ship and target close during five hundred milliseconds, whereby the total effective target echo length is 500 yards.

|  | Yards per second |
|---|---|
| Sound velocity | 1640 |
| Target speed component (closing) | 5.55 |
| Own-ship's speed component | 8.32 |
| Total range rate (closing) | 13.9 |
| Two way sound velocity | 820 |

For A ping only (approximate)
(1) Time required for ping to reach target $$\frac{60,000}{1640+5.5}=36.5 \text{ seconds}$$

(2) Target range at $T=36.5$ seconds $$60,000-(13.9)\times(36.5)=59,500 \text{ yards}$$

(3) Time required for ping to return to transducer $$\frac{59,500}{1640+8.35}=36.1 \text{ seconds}$$

(4) Target range at $T=(36.5+36.1)$ or $T=72.6$ seconds $$60,000-(13.9)\times(72.6)=59,000 \text{ yards}$$

(5) Sonar indicated target range $$(72.6)\times(820)=59,500$$

(6) Range correction to remove component of own ship range rate correction of A echo to B echo $T=25$ seconds
Correction needed is $(8.32\times25)=210$ yards
Correction to C echo is 420 yards
B echo correction to C echo is 210 yards Times and ranges refer to leading edge of transmission.

SEQUENCE OF EVENTS

| Time (seconds) | Event | Target Range (yards) | |
|---|---|---|---|
| | | Actual | Indicated |
| 0 | Transmission of A ping | 60,000 | |
| 25 | Transmission of B ping | 59,650 | |
| 36.5 | Target Ensonified by A ping | 59,500 | |
| 50 | Transmission of C ping | 59,310 | |
| 61.3 | Target ensonified by B ping | 59,150 | |
| 72.6 | Reception of A echo | 59,000 | 59,500 |
| 75 | Transmission | | |
| 86.1 | Target ensonified by C ping | 58,810 | |
| 97.2 | Reception of B echo | 58,660 | 59,200 |
| 100 | Transmission | | |
| 121.8 | Reception of C echo | 58,310 | 58,900 |
| 125 | Transmission, etc. | | |

FIG. 4 shows the relationship of A, B, and C echoes at the instant $T-125$ seconds.

A echo 59,500–420 yards correction=59,080
B echo 59,200–210 yards correction=58,990
C echo 58,900–0 yards correction
In the above relationship, the white spot represents 320 yards and the bright hues represent 460 yards.

No adjustment has been made for the target range rate in this illustration. During the 12.5 seconds display time the display will automatically scan various target range rates so complete echo overlap is insured.

In the preceding example the range rate (closing) is twenty-five knots and during the interval of three sonar transmissions the range to the target closes six hundred yards. For a target echo length of five hundred yards, no overlapping of three echoes takes place on the color display without the introduction of a correction of own-ship's motion. A correction can be applied to each of the three display (readout) circuits separately and be applied uniformly throughout the presentation cycle. At the beginning of the 12.5 seconds that a storage device is storing new information, the aggregate correction for own-ship's motion would be removed and the correction system recycled. Each color would then display a picture which is a geographic plot over one cycle. The overall three-color display would be essentially a geographic plot, relative to the target, integrated over three transmission periods. Own-ship's motion can be simply computed from gyro and pit log circuits.

It will be understood that various changes in the details, materials and arrangements of parts (and steps), which have been herein described and illustrated in order to explain the nature of the invention, may be made by those skilled in the art within the principle and scope of the invention as expressed in the appended claims.

What is claimed is:

1. In the method of underwater echo ranging, the improvement comprising:
    (a) emitting a coustic pulse and recording echoes returned thereby in one primary color along a trace path on the screen of the three color cathode ray tube and on a particular time base referred to the emission of the acoustic pulse,
    (b) then emitting a succeeding acoustic pulse and recording echoes returned thereby in another primary color along the same trace path on the same time base referred to the emission of the respective pulse,
    (c) then emitting a succeeding acoustic pulse and recording echoes returned thereby in another primary color along the same trace path and on the same time base referred to the emission of the respective pulse,
    (d) whereby echoes returned from non transient discontinuities register in approximately white and, are readily distinguishable from random noise registrations that appear along the time base in a scattering of the primary colors.

2. In an underwater echo ranging apparatus having a transducer, a transmitter, and receiver, the improvement comprising:
    (a) a three gun cathode ray color tube and deflection means for directing the beam from each gun to impinge the tube face, along a selected trace path,
    (b) means coupled to the transmitter and to the deflection means for synchronizing the operation of the deflection means and the transmitter, and
    (c) means coupled to the receiver and to the electrons guns to record echoes returned by each of three successive pulses in different primary colors whereby random noise appears on the display in one of the primary colors and target echoes correlate and appear on the display in white.

3. A method of employing a three gun color display cathode ray tube in an underwater echo ranging system for improving target echo to random noise discrimination and for indicating the range rate of detected moving targets, wherein the cathode ray tube registers an approximately white local area when that local area is struck by beams from each of the three guns within the phosphor persistence time comprising:
    transmitting three time-spaced acoustic pulses,
    receiving echoes returned by each of the successive pulses,
    quantizing those received echoes exceeding a threshold amplitude to echo pulses of a predetermined amplitude,
    writing at least once the quantized echoes returned by the three transmitted pulses with the three guns respectively along a common trace path on the cathode ray tube,
    whereby echoes returned by a target correlate as a white spot and random noise does not correlate in the three colors but is displayed in scattered colors of lower luminous intensity than the white spot, and whereby range rate is indicated by two relatively bright hues oppositely extending from a white spot each of the latter resulting from the combination of one of the three colors in common and different ones of the other two colors.

4. A method as defined in claim 3 further comprising:
    transmitting a plurality of successive additional sequences of three time-spaced acoustic pulses, and
    writing echoes returned by successive three pulse sequences along different trace paths on the cathode ray tube.

5. A method as defined in claim 4 further comprising:
    separately recording the echo signals returned by three successive transmitted pulses and reading out the respective stored echo signals for delivery to the three guns.

References Cited by the Examiner

UNITED STATES PATENTS

| 2,901,747 | 8/1959 | Sunstein | 343—17 |
| 3,064,234 | 11/1962 | Barrett | 340—3 |
| 3,114,907 | 12/1963 | Luftman | 343—7.7 |
| 3,156,110 | 11/1964 | Clynes | 343—17 X |

FOREIGN PATENTS

| 722,858 | 2/1955 | Great Britain. |
| 740,148 | 11/1955 | Great Britain. |
| 889,485 | 2/1962 | Great Britain. |

CHESTER L. JUSTUS, *Primary Examiner.*

R. A. FARLEY, *Assistant Examiner.*